Figure 1:
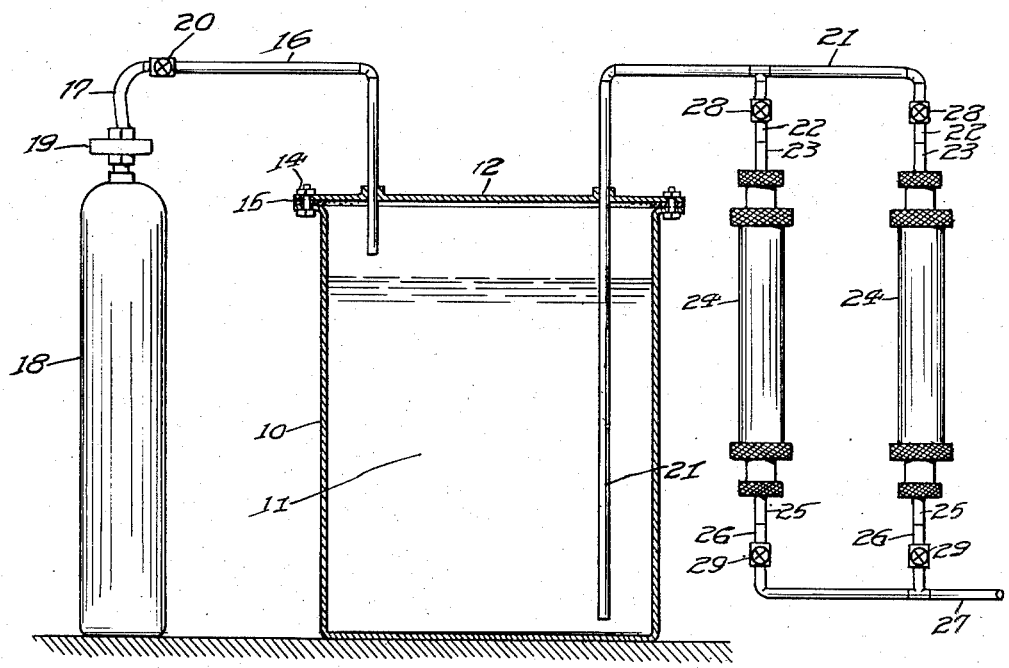

Dec. 25, 1951 J. W. ROBINSON 2,579,863
FILTER ASSEMBLY
Filed July 8, 1946 3 Sheets-Sheet 1

WITNESS
F. J. Hartman

INVENTOR
John Warren Robinson
BY EA Fenander
his ATTORNEY

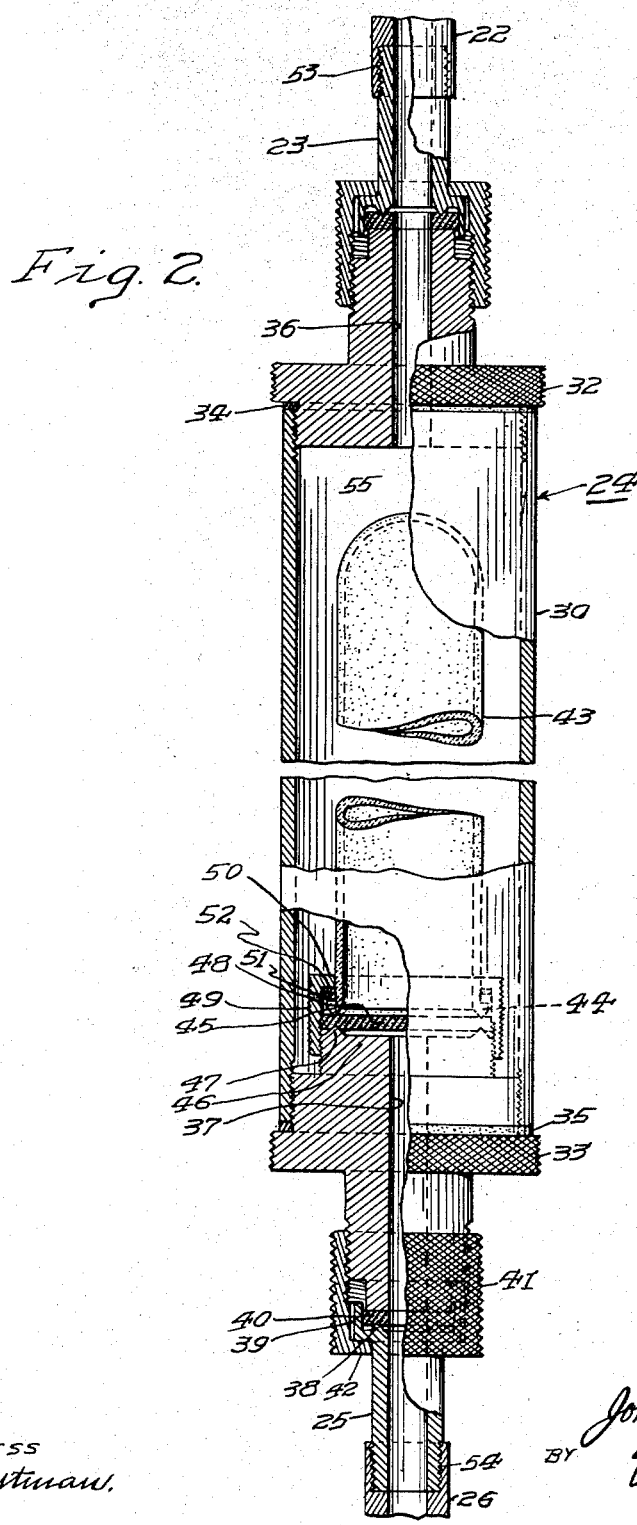

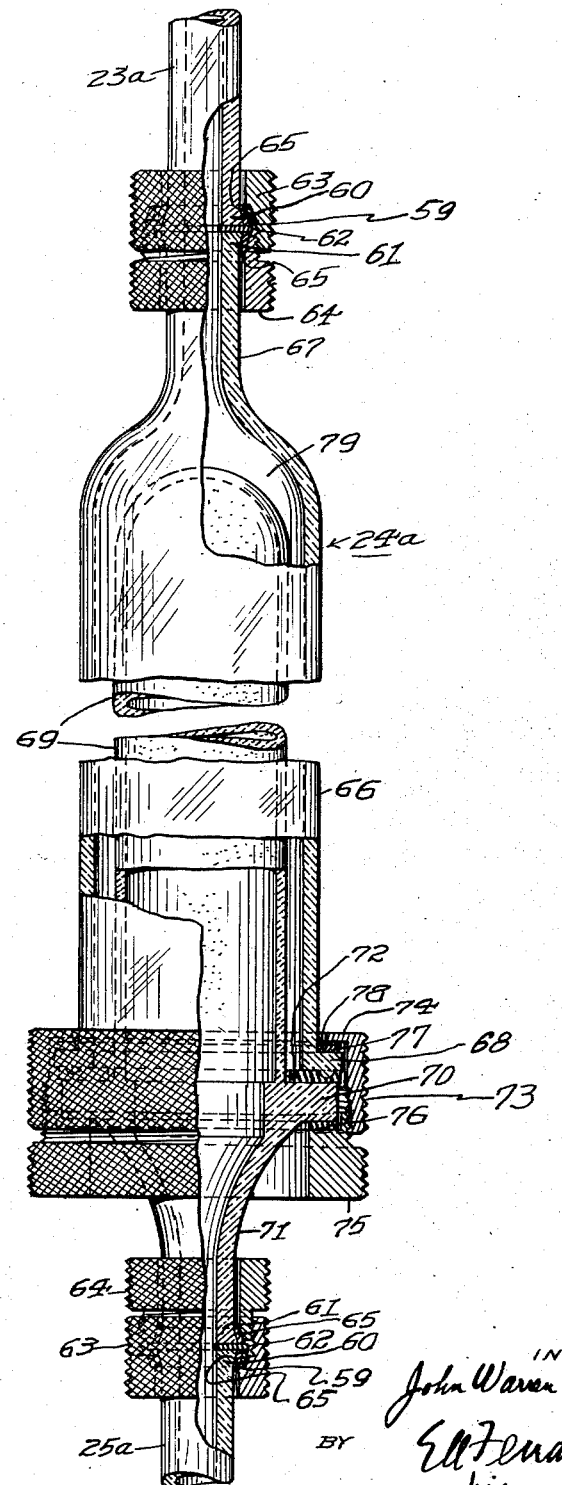

Patented Dec. 25, 1951

2,579,863

UNITED STATES PATENT OFFICE 2,579,863

FILTER ASSEMBLY

John Warren Robinson, Merchantville, N. J., assignor to Selas Corporation of America, Philadelphia, Pa., a corporation of Pennsylvania Application July 8, 1946, Serial No. 681,910

2 Claims. (Cl. 210—113)

1

My invention relates to the art of filtering and is especially concerned with filtering units detachably connected in filtering systems and through which liquid to be filtered is adapted to pass under pressure.

In many filtering operations in which microporous filter elements are employed, it has usually been the practice to effect such operations by vacuum filtration, that is, by producing a suction effect to cause flow of fluids through the filter elements. When liquid is filtered in this manner to effect clarification, polishing and sterilization, for example, the filtering process is relatively slow and tedious. Further, vacuum filtration is objectionable in many instances because the liquid or solution being filtered becomes concentrated due to evaporation taking place more readily on account of the reduced pressure prevailing in the filter system.

It is an object of the invention to provide an improvement for continuously filtering liquids under pressure whereby liquids can be filtered rapidly and the disadvantages of vacuum filtration are avoided. I accomplish this by providing a filter assembly which is adapted to be connected in a line of a filtering system through which the liquid to be filtered passes under pressure, the filter assembly being of such construction that it may be quickly fixed securely in position in the line and disconnected therefrom by hand and without the aid of tools. The filter assembly of the invention preferably embodies a filter unit which can be taken apart conveniently and without difficulty for cleaning and sterilization.

In many instances the liquid or solution to be filtered should not come in contact with metal. Hence, in accordance with the invention a filter unit for use in a pressure filtering system is contemplated which is formed of non-metallic inert materials and of such construction that the unit can be readily connected in a liquid line and removed therefrom and easily taken apart for cleaning and sterilization.

The above and other objects and advantages of the invention will be more fully understood upon reference to the following description and the accompanying drawing forming a part of this specification, and of which Fig. 1 illustrates more or less diagrammatically a filtering system in which are provided filter assemblies embodying the invention and through which liquid to be filtered is adapted to pass under pressure; Fig. 2 is an enlarged view, partly in section, of one of the filtering assemblies shown in Fig. 1; and Fig. 3 is a view similar to Fig. 2 illustrating another

2 embodiment of the invention which is especially suitable for filtering liquid or solutions which should not come in contact with metal.

Referring to Fig. 1 of the drawing, I have shown more or less diagrammatically a filtering system including a vessel 10 adapted to contain a body 11 of liquid or solution to be filtered. The vessel 10 may be provided with a cover 12 removably secured thereto, as indicated at 14. To insure a fluid tight seal when the cover 12 is secured in position, a suitable gasket 15 may be provided about the top edge of the vessel 10 against which the cover is adapted to bear.

A suitable gas, such as nitrogen, for example, is supplied under pressure through a conduit 16 to the space in the vessel 10 above the liquid surface level therein. The conduit 16 extends through the cover 12 and the inlet end thereof is connected by flexible tubing 17 to a high pressure gas cylinder 18. A pressure regulator 19 is provided at the gas cylinder 18 to which the flexible tubing 17 is connected. The pressure regulator 19 serves to reduce the pressure of the gas so that the filtering system will not be subjected to the full gas pressure in the cylinder 18 and also maintains the gas delivered to the vessel 10 at a substantially constant pressure. A manually operable control valve 20 may be connected in the conduit 16 in addition to the conventional hand operated valve (not shown) usually provided on gas cylinders of the type illustrated.

A conduit 21 through which liquid passes from the vessel 10 extends downwardly through the cover 12 and the lower end thereof terminates a short distance from the bottom of the vessel. Due to the pressure of the gas at the liquid surface level of the liquid body 11, liquid is forced upwardly under pressure through the conduit 21. The portion of the conduit 21 extending from the vessel 10 may serve as a manifold to which are connected branch conduits 22.

To each branch conduit 22 is connected an inlet conduit connection 23 of a filter assembly 24 embodying the invention. The liquid passing through each filter assembly 24 flows through a filter element therein, as will be described presently, and the filtered liquid passes through an outlet conduit connection 25 which is connected to a branch conduit 26. The branch conduits 26 are connected to a manifold 27 through which the filtered liquid passes, as to a collection vessel, for example. Suitable valves 28 and 29 may be provided in the branch conduits 22 and 26, respectively, whereby the flow of liquid through a particular filter assembly 24 may be shut off when it becomes necessary to disconnect such filter assembly.

In accordance with the invention, each filter assembly 24 comprises a hollow sleeve 30 to the opposite ends of which are threadedly connected end members or bodies 32 and 33, respectively. To insure a fluid tight seal the end members 32 and 33 are flanged to provide shoulders which receive gaskets 34 and 35, respectively, against which the ends of the sleeve 30 are adapted to bear. The end members 32 and 33 are formed with openings or apertures 36 and 37, respectively, and the outer reduced end portions of these members or bodies are detachably connected to the inlet and outlet conduit connections 23 and 25, respectively.

As shown, the open ends of the inlet and outlet conduit connections 23 and 25 are each formed with a circular ridge or raised portion 38 and a relatively short sleeve 39 about such ridge to form a well adapted to receive and hold an annular washer 40 formed of resilient material. The washers 40 bear against the outer reduced end portions of the end members 32 and 33 and are snugly held in position by open-ended caps 41.

The caps 41 are formed with inwardly extending flanges 42 and are adapted to fit over the inlet and outlet conduit connections 23 and 25, so that parts of the caps at opposite ends of the filter unit extend axially toward each other and the flanges 42 overlie the outwardly extending shoulders formed by the sleeve portions 39 of the conduit connections 23 and 25. The caps 41 threadedly engage the end members 32 and 33 and may be turned to draw the flanges 42 toward the shoulders of the inlet and outlet conduit connections and bring the end members 32 and 33 and the conduit connections tightly together and compress the washers 40 therebetween.

Within the sleeve 30 is disposed a filter 43 comprising an elongated hollow element of porous material closed at one end and open at its opposite end. The filter element 43 is smaller in diameter than the sleeve 30 and positioned in the latter so that the closed end of the filter element is adjacent to the inlet end of the filter assembly 24. The open end of the filter element 43 is formed with an outwardly extending shoulder 44. The shoulder 44, which is fluid impervious, is provided with a circular ridge or raised portion 45 at the extreme outer end thereof and is detachably connected to the end member 33.

As shown, the end member 33 is formed with an inner portion 46 which is smaller in diameter than the sleeve 30 and projects into the latter. The reduced inner portion 46 of the end member 33 is also formed with a circular ridge or raised portion 47. An annular washer 48 of resilient material is positioned between the open end of the filter element 43 and the end member 33 whereby the aperture 37 in the latter is in communication with the interior of the filter element.

A hollow open-ended cap 49 having an inwardly extending flange 50 is adapted to fit over the filter element 43 and be positioned thereon on that a part of the cap extends beyond the open end of the filter element and the flange 50 overlies the shoulder 44. The cap 49 threadedly engages the reduced inner end portion 46 of the end member 33, whereby the cap may be turned to draw the flange 50 toward the shoulder 44 of the filter element 43 and compress the washer 48 between the end member 33 and the open end of the filter element.

By holding the end member 33 in a fixed position against the open end of the filter element 43 while the washer 48 is disposed between these parts, the cap 49 may be turned to threadedly connect the latter to the end member 33 and move the filter element and washer and end member 33 tightly together without effecting relative angular movement of the washer 48 with respect to the end member 33 and the filter element. In this way crimping and cutting of the washer 48 is avoided.

When the cap 49 is turned to connect the filter element 43 and the end member 33, it is desirable to avoid frictional contact between the flange 50 of the cap and the shoulder 44 of the filter element. This is accomplished by providing an annular cushion 51 of resilient material which is disposed about the filter element and bears directly against the shoulder 44 thereof. In addition, an annular slip ring 52 is also disposed about the filter element which rests directly upon the cushion 51 and is interposed between the latter and the flange 50 of the cap 49. When the cap 49 is turned to draw the open end of the filter element and end member 33 tightly together, the flange 50 will slide over the surface of the slip ring 52 without effecting relative angular movement between the shoulder 44 of the filter element and the cushion 51.

It will now be understood that an improved filter assembly 24 has been provided which can be readily connected in a line of a filtering system. When the filter assembly is initially connected in the filtering system, the inlet and outlet conduit connections 23 and 25 are threadedly connected at 53 and 54, respectively, to the branch conduits 22 and 26. Before the inlet and outlet conduit connections are secured in position at the spaced apart end of the conduits 22 and 26, the hollow open-ended caps 41 are slipped over the conduit connections 23 and 25 at the narrow ends thereof. Hence, the inlet and outlet conduit connections 23 and 25 and open-ended caps 41 associated therewith form a permanent part of the filter line in which the filter unit is adapted to be connected.

When the filter unit, including the sleeve 30 and end members 32 and 33, is connected in position in the filter line, the washers 40 are first inserted into the wells formed by the short sleeves 39 and the filter unit is then positioned between the inlet and outlet conduit connections 23 and 25. When so positioned, the filter unit substantially bridges the gap between the inlet and outlet conduit connections and it is only necessary to turn the caps 41, which threadedly engage the end members 32 and 33, to bring the ends of the filter unit and conduit connections 23 and 25 tightly together and compress the washers 40 therebetween.

By simply turning the caps 41 to connect the filter unit in position as just described, no relative angular movement of the washers 40 with respect to the end members 32 and 33 and conduit connections 23 and 25 is effected, whereby crimping and cutting of the washers 40 is avoided. Further, by providing the caps 41 with knurled exterior surfaces to provide a good hand grip of these parts, the filter unit can be connected in position by hand and without the aid of tools and insure a fluid tight connection of the end members 32 and 33 to the inlet and outlet conduit connections 23 and 25.

When it is desired to remove one of the filter units from the filtering system, it is only necessary to disengage the caps 41 from the end members 32 and 33 which also can be accomplished by hand and without the use of tools. After the caps 41 are rotated approximately half a turn by hand to loosen the initial tight fit, the caps can be disengaged from the end members 32 and 33 by a single spinning movement imparted to the caps.

The filter elements 43 of the kind illustrated are usually of a micro-porous type and may be formed of ceramic material. Such filter elements are especially suitable for the clarification, polishing and sterilization of liquids, for example. In order to facilitate cleaning and sterilization of filter units of this kind, as in an autoclave, for example, it is desirable to provide filter units which can be taken apart conveniently and without difficulty. It is for this reason that the end member 33 is detachably connected to the sleeve 30 of the filter unit and the filter element 43 in turn is detachably connected to the end member 33.

After the filter unit is disconnected from one of the filter lines, the end members 32 and 33 are readily removed by hand and without the use of tools. To facilitate such removal of the end members 32 and 33, the outer peripheral surfaces thereof may also be knurled to provide a good hand grip of these parts. The filter element 43 likewise can be readily removed by a simple turning movement of the open-ended cap 49 whose outer peripheral surfaces may also be knurled. Thus, all parts of the filter unit can be conveniently cleaned and sterilized individually to insure absolute sterilization of each part before the filter unit is again reassembled in a line of the filtering system. When it becomes necessary to sterilize the branch conduits 26 and manifold 27, this can be conveniently done by flushing these parts of the filtering system by steam.

Since the porous filter element 43 is usually formed of ceramic or like material having roughened surfaces, it is extremely undesirable for the cap 49 to rub directly against the shoulder 44 when the cap is connected to the end member 33. By providing the cushion 51 which bears directly against the shoulder 44 and always remains in a fixed position about the open end of the filter element 43, the open end of the filter element is protected from any possible injury. The slip ring 52, which rests upon the cushion 51 and is desirably formed of metal, plastic, or fibrous material which is smoothly finished, provides a contacting surface for the flange 50 of the cap 49 over which the flange can slide freely when the cap is being connected to the end member 33.

The gaskets 34 and 35, washers 40 and 48 and cushion 51 may be formed of any suitable material, such as rubber, for example, which is resilient and yet not unduly soft so that fluid tight connections are assured when the filter assembly is installed in one of the filter lines. The liquid to be filtered passes through each branch conduit 22 and aperture 36 into the chamber 55 formed by the sleeve 30. Since the liquid passes under pressure into the chamber 55, such liquid is forced through the pores of the filter element 43 into the interior thereof from which the filtered liquid is discharged through the aperture 38 into the branch conduit 26 and thence into the manifold 27.

For many biological filtering operations, such as in filtering penicillin solutions, for example, the metal parts of the filter assembly 24 just described may be formed of stainless steel. By employing stainless steel parts in the filter assembly 24, all of the metal surfaces are non-corrosive and substantially inert to most solutions other than strong mineral acids. While the particular parts of the filter assembly may be formed of brass which is coated with tin or chromium plated, such coating materials are subject to wear and easily injured. Stainless steel does not require a surface coating of material and is the only metal, other than precious metals like gold and silver, which is generally acceptable for biological filtering operations.

In some instances, however, it is undesirable for the liquid or solution to be filtered to come in contact with metal. This is especially true when the metal reacts chemically with the solution being filtered and forms a salt of such solution. In such cases it is necessary to provide a filter unit in which the parts thereof contacted by the liquid to be filtered are formed of non-metallic inert material, such as glass, plastic or porcelain and the like, for example.

In Fig. 3 I have shown an embodiment of the invention suitable for filtering liquids which cannot come in contact with metal. The filter unit 24a of Fig. 3 is generally like that first described in that it can be connected conveniently and without difficulty in a filter line of a filtering system like that shown in Fig. 1. In such case the vessel 10 and cover 12 for holding the body of liquid are preferably glass or porcelain lined and the conduits 21, 22, 26 and 27 are also desirably formed of glass or like material.

In Fig. 3 the conduits 23a and 25a correspond to the branch conduits 23 and 25 in Fig. 1 and are formed with shoulders 60 at the open ends thereof. The inlet and outlet ends 67 and 71 of the filter unit 24a are formed with shoulders 61 which are in alignment with the shoulders 60 and between which resilient washers 62 are positioned.

The conduit connections 23a and 25a and the ends of the filter unit are detachably connected by unions each comprising a pair of threadedly connected members 63 and 64. In order to protect the conduit connections 23a and 25a and the ends of the filter unit, which are formed of non-metallic material, the members 63 and 64 act against resilient gaskets 65 disposed about the shoulders 60 and 61. In order to avoid crimping and cutting of the resilient gaskets 65 disposed about the shoulders 60 when the members 63 are turned to draw the ends of the filter unit and conduit connections toward each other, slip rings 59 may be provided about such gaskets 65 over which the members 63 slide.

Hence, by holding the members 64 in a fixed position against the gaskets 65 associated therewith and only turning the members 63, cutting and crimping of the gaskets 65 is prevented. The members 63 and 64 forming the union connections just described are provided with knurled exterior surfaces whereby the filter unit to be described presently may be connected in the filter line and disconnected therefrom by hand and without the aid of tools in the same manner as the filter assembly 24 first described.

The filter unit of Fig. 3 comprises a non-metallic sleeve 66 having a reduced portion 67 at one end which serves as the inlet of the unit and an outwardly extending shoulder 68 at its opposite end which is fluid impervious. Within the sleeve 66 and of smaller diameter than the latter is axially positioned an elongated hollow filter element 69 having the closed end thereof adjacent to the inlet end of the filter unit.

The porous filter element 69 is formed with an outwardly extending imperforate shoulder 70, and from such shoulder projects a narrow reduced tube section 71 which is imperforate and may be formed integrally with the filter element 69. The tube section 71 projects beyond the sleeve 66 and serves as the outlet end of the filter unit. An annular resilient washer 72 is positioned between the shoulders 68 and 70 of the sleeve 66 and filter element 69, respectively, such washer being snugly held between these parts by a detachable connector including an open-ended hollow cap 73 having an inwardly extending flange 74 which overlies the shoulder 68 of the sleeve 66.

The cap 73 threadedly engages a member 75 which acts against the shoulder 70 of the filter element 69 through an annular resilient cushion 76. When the member 75 is held in a fixed position against the cushion 76 which in turn bears against the shoulder 70, the cap 73 may be turned to draw the sleeve 66 and filter element 69 tightly together at the shoulders 68 and 70 thereof without effecting relative angular movement of the washer 72 and cushion 76 with respect to the shoulders 68 and 70 and connecting member 75.

In order to prevent rubbing of the flange 74 of cap 73 on the shoulder 68 of the sleeve 66, an annular resilient cushion 77 is arranged about the sleeve against the shoulder 68, and an annular slip ring 78 is interposed between such cushion and the flange 74 of the cap 73. Hence, as in the embodiment first described, the flange 74 will slide over the slip ring 78 when the cap 73 and member 75 are threadedly connected together and the cushion 76 will remain fixed with respect to the shoulder 68.

It will now be understood that a filter unit has been provided in which liquid under pressure can be filtered without coming in contact with metal. By employing a porous filter element 69 which is formed of ceramic or like material and providing a non-metallic outer sleeve 66 which is formed of glass, porcelain, or plastic and the like, for example, the liquid entering the chamber 79 through the inlet conduit connection 23a can only come in contact with non-metallic surfaces. Since the liquid in the chamber 79 is under pressure, such liquid will pass through the porous filter element 69 into the interior thereof and thence pass through the imperforate tube section 71 without coming in contact with any metallic surface.

The filter unit 24a after being disconnected from the filter line can be readily taken apart by hand and without the aid of tools by disengaging the cap 73 from the member 75. To facilitate such separation of the filter unit, the cap 73 and member 75 may be provided with knurled outer peripheral surfaces. Thus, the parts of the filter unit 24a may be individually cleaned and sterilized to insure absolute sterilization of all parts before the filter unit is again reassembled and installed in position in one of the filter lines.

What is claimed is:

1. A filter unit adapted to be connected in a line of a filtering system in which liquid to be filtered is passed therethrough under pressure without coming in contact with metal, said unit comprising an elongated open-ended hollow sleeve formed of a fragile material which will crack or chip, one end of the sleeve serving as the inlet for the unit and the opposite end being formed with an outwardly extending shoulder, a filter element comprising an elongated hollow body of fragile porous material which will chip or crack closed at one end and open at its opposite end, the element being insertable into the sleeve whereby the closed end is adjacent to the inlet end of the sleeve, said element having an outwardly extending shoulder, an annular washer of resilient material positioned between the shoulders of the sleeve and the element, means for detachably connecting the sleeve and the element at the shoulders thereof including a first member coacting with the shoulder of the sleeve and adapted to exert force against the latter and a second member threadedly engaging the first member and coacting with the shoulder of the element and adapted to exert force against the latter for holding the washer snugly pressed between the shoulders of the sleeve and element, a first annular cushion of resilient material positioned between the shoulder of the element and the second member, a second annular cushion of resilient material disposed about the sleeve and bearing against the shoulder thereof, and an annular slip ring disposed about the sleeve which bears against the second cushion and is interposed between the latter and the first member so that, when the first member is being threadedly connected to the second member, the first member will slide over the slip ring and axially move the sleeve and washer and element and cushions tightly together without effecting relative angular movement of the washer and first cushion with respect to the sleeve and the element and without effecting relative angular movement between the sleeve and the second cushion, said cushion members operating to transmit force to said flanges to thereby prevent chipping or cracking of the latter.

2. A filter unit adapted to be connected in a line of a filtering system in which liquid to be filtered is passed therethrough under pressure, the unit comprising an elongated open-ended hollow sleeve formed of fragile material that will chip or crack, one end of the sleeve serving as an inlet and the opposite end being formed with an outwardly extending shoulder, a filter comprising an elongated hollow element of fragile porous material that will chip or crack closed at one end and open at its opposite end, the element being insertable into the sleeve whereby the closed end is adjacent to the inlet end of the sleeve, said element having an outwardly extending shoulder, an imperforate tube section serving as an outlet which communicates with the interior of the element and projects beyond the sleeve from the shoulder of the filter element, an annular washer of resilient material positioned between the shoulders of the sleeve and the element, means for detachably connecting the sleeve and the element at the shoulders thereof including a hollow open-ended cap having an inwardly extending flange coacting with the sleeve and adapted to exert force against the shoulder thereof and a member threadedly engaging the cap and coacting with the element and adapted to exert force against the shoulder thereof for holding the washer snugly pressed between the shoulders of the sleeve and the element, a first annular cushion of resilient material positioned between the shoulder of the element and the member, a second annular cushion of resilient material disposed about the sleeve and bearing against the shoulder thereof, and an annular slip ring disposed about the sleeve which bears against the second cushion and is interposed between the latter and the cap so that, when the cap is being threadedly connected to the member, the cap will slide over the slip ring and axially move the sleeve, element, washer and cushions tightly together without effecting relative angular movement of the washer and first cushion with respect to the sleeve and the element and without effecting relative angular movement between the sleeve and second cushion, said cushion members operating to transmit force to said flanges to thereby prevent chipping or cracking of the latter.

JOHN WARREN ROBINSON.

REFERENCES CITED

The following references are of record in the file of this patent:

UNITED STATES PATENTS

| Number | Name | Date |
|---|---|---|
| 471,385 | Holt | Mar. 22, 1892 |
| 479,381 | Way | July 19, 1892 |
| 627,594 | Saunders | June 27, 1899 |
| 752,873 | Sweeney | Feb. 23, 1904 |
| 813,429 | Hull | Feb. 27, 1906 |
| 872,437 | Leonard | Dec. 3, 1907 |
| 1,157,934 | Gehrke | Oct. 26, 1915 |
| 1,783,410 | Cowell | Dec. 2, 1930 |

FOREIGN PATENTS

| Number | Country | Date |
|---|---|---|
| 15,998 | Great Britain | 1899 |
| 149,808 | Great Britain | Aug. 26, 1920 |
| 164,894 | France | Oct. 20, 1884 |
| 298,310 | France | June 30, 1900 |
| 352,516 | France | June 5, 1905 |
| 359,529 | France | Jan. 25, 1906 |
| 500,416 | France | Dec. 16, 1919 |